No. 613,009. Patented Oct. 25, 1898.
R. A. & D. L. JENKINS.
SLIDING GATE.
(Application filed Mar. 10, 1898.)
(No Model.)
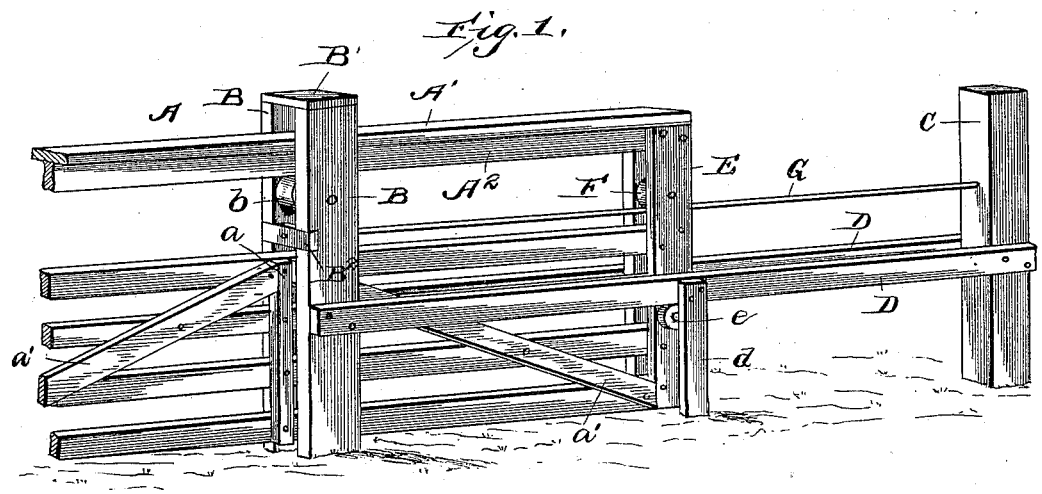
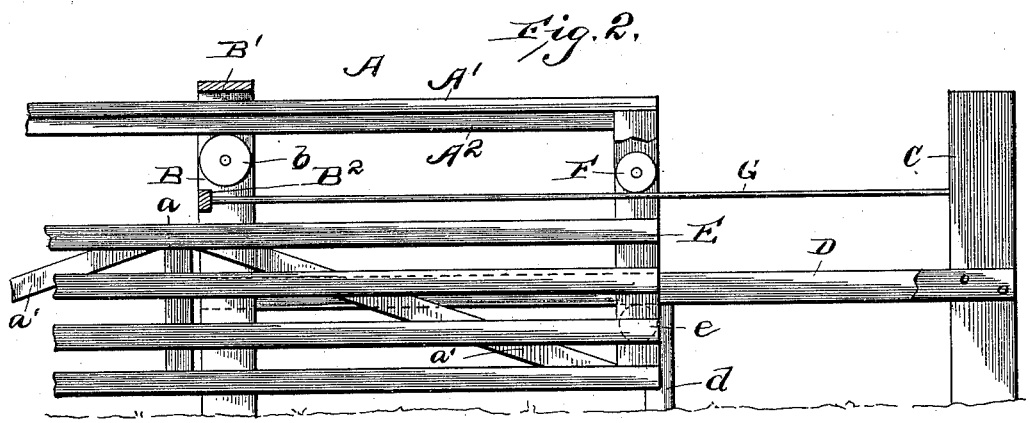
Witnesses
Wm H. Edwards Jr.
Herbert Lawson.
Inventors
Rulif A. Jenkins and
David L. Jenkins
By Edwin ...
Attorneys
THE NORRIS PETERS CO., PHOTO-LITHO., WASHINGTON, D. C.

UNITED STATES PATENT OFFICE.

RULIF A. JENKINS AND DAVID L. JENKINS, OF CAMDEN, MICHIGAN.

SLIDING GATE.

SPECIFICATION forming part of Letters Patent No. 613,009, dated October 25, 1898.

Application filed March 10, 1898. Serial No. 673,375. (No model.)

*To all whom it may concern:*

Be it known that we, RULIF A. JENKINS and DAVID L. JENKINS, citizens of the United States, residing at Camden, in the county of Hillsdale and State of Michigan, have invented certain new and useful Improvements in Sliding Gates; and we do hereby declare the following to be a full, clear, and exact description of the invention, such as will enable others skilled in the art to which it appertains to make and use the same.

This invention is an improvement in sliding gates, its object being to provide a gate which shall be simple and economical in construction, durable in use, and easy of manipulation.

To these ends the invention consists in the novel construction and combination of parts hereinafter described, and illustrated in the accompanying drawings, in which—

Figure 1 is a detailed perspective view of our invention, showing the gate half closed; and Fig. 2 is a vertical longitudinal section thereof.

Referring to said drawings, showing the preferred embodiment of our invention, by letters of reference, A is a gate, of ordinary construction, having the upright $a$ in the center thereof, from the top of which to the lower part of each end of said gate extend the braces $a'$, as shown. Said central upright does not, however, extend the full height of the gate, but terminates with the cross-bar next to, but at a suitable distance from, the upper bar thereof. This upper bar is formed of two strips $A'$ $A^2$, preferably T shape in cross-section and firmly secured to the end posts of the gate. This construction gives us a cross-bar which is practically incapable of bending under the strain to which it is subjected, as will hereinafter be described. The upper section $A'$ of the cross-bar is of sufficient width to permit it to pass freely, yet without unnecessary play, between the two upright posts B B of greater height than the gate, which are connected at the top by means of a cross-piece $B'$. Pivoted between said posts at a point a sufficient distance below the cross-piece $B'$ to permit the passage thereunder of top bar $A'$ $A^2$ is a roller $b$, upon which the upright section $A^2$ of said top bar is adapted to travel, presenting but little surface thereto and being guided thereover by the section $A'$.

Directly to the rear of the posts B B, at a distance equal at least to the length of gate A, is a third post C. Each side of said post is connected to the outer side of one of the posts B B by a horizontal side bar D, each of these bars being attached at suitable points thereon, preferably near and equally distant from the ground. We preferably strengthen the side bars at a point near the center by means of upright supports $d$ $d$, as shown.

The end post E of gate A, which is situated at all times to the rear of posts B B, is composed of two vertical side strips having pivoted therebetween and directly under the top bar $A'$ $A^2$ a roller F, adapted to travel upon a taut horizontal wire G, strung between a cross-piece $B^2$ on the posts B B and the rear post C, as shown. Said wire may be tightened by any desired means.

At a point on each side of end post E of the gate and projecting laterally therefrom are rollers $e$, adapted to run directly upon the under side of bars D during the operation of the gate.

The gate upon being opened travels upon roller $b$ and the under side of bars D until the weight upon each side of said roller is equalized, when wire G takes up the strain for the remainder of the distance.

It will be noticed that all tilting or sagging of the gate when closed is prevented by reason of the bars D, against which said gate bears upwardly; also, that but a minimum amount of material is necessary in the construction of this invention and that a great amount of friction is overcome by the use of wire for a runway for the gate.

We do not limit ourselves to the preferred form of sliding gate herein shown and described, as we are aware that modifications thereof may be made and embraced within the scope of our invention.

Having thus fully described our invention, what we claim as new, and desire to secure by Letters Patent, is—

1. In a gate, the combination of a roller in one end thereof, and a wire, as shown, for supporting said roller; with a roller projecting from each side of said end, and parallel horizontal bars, said projecting rollers bearing upon the under side of said bars, substantially as described.

2. The combination with a gate, a roller pivoted within the gate-post, for supporting the top bar of said gate, a roller within the upper part of the end of the gate and a roller projecting from each side of the lower part thereof, of means for supporting said gate when open, consisting of a wire, strung between the gate-post and a second post, for supporting the roller within the end of the gate after said gate reaches a half-opened position, and horizontal, parallel side bars for limiting the upward movement of the side rollers, substantially as described.

3. The combination of a gate, constructed substantially as shown and described, having a roller within the upper portion of the end thereof, and a roller projecting from each side of said end; with a roller in the upper part of the gate-post supporting the top bar of said gate, a horizontal wire tightened by suitable means, strung between the upper ends of two posts, and supporting the roller in the end section of said gate, and parallel, horizontal bars adapted to prevent the upward movement of the rollers bearing upon the lower surface thereof and projecting from the end of the gate, substantially as and for the purposes set forth.

In testimony whereof we affix our signatures in presence of two witnesses.

RULIF A. JENKINS.
DAVID L. JENKINS.

Witnesses:
O. O. PRESHALL,
J. C. BRADLEY.